Oct. 18, 1966     A. T. BUTTRISS     3,279,729

FASTENER DEVICE AND MOUNTING ASSEMBLY

Filed Aug. 31, 1964     2 Sheets-Sheet 1

INVENTOR.
ALBERT T. BUTTRISS
BY *Teare, Tetzer & Teare*
ATTORNEYS

Oct. 18, 1966     A. T. BUTTRISS     3,279,729
FASTENER DEVICE AND MOUNTING ASSEMBLY
Filed Aug. 31, 1964                    2 Sheets-Sheet 2

INVENTOR.
ALBERT T. BUTTRISS
BY
ATTORNEYS

United States Patent Office 3,279,729
Patented Oct. 18, 1966

3,279,729
FASTENER DEVICE AND MOUNTING ASSEMBLY
Albert T. Buttriss, Westlake, Ohio, assignor to Tinnerman Products, Inc., a corporation of Ohio
Filed Aug. 31, 1964, Ser. No. 393,170
12 Claims. (Cl. 248—27)

This invention relates in general to fastening means and more particularly to fastener devices and an assembly for retaining objects, such as electrical connectors, in mounted relation on a workpiece.

Conventionally, various types of electrical connectors have been mounted on panels, modules or circuit board racks, such as applied in electronic installations, for connection to a source of electrical power. Heretofore, various fastening devices and/or assemblies, such as screw or rivet arrangements, have been proposed for mounting such connectors on the panels. In this respect, it has been found that these heretofore known devices are not satisfactory due to their expense of manufacture and the difficulty incident to their assembly and disassembly, particularly in relation to the installation of a great number of connectors in blind locations which are not readily accessible at the rear of the panel to complete the installation. It has further been found that these heretofore known devices do not afford an exact alignment between the parts, particularly when there exists substantial tolerance variation between the parts; nor do they prevent lateral shifting movement of the connectors, particularly where adjacent of the connectors are either missing or removed from installed position on the panel.

Accordingly, an object of the present invention is to provide a simple, yet sufficient fastener device construction which is inexpensive to produce for mounting an electrical element, such as a connector to a workpiece.

Another object of the present invention is to provide a sheet metal fastener device of the character described which can be readily and easily assembled and disassembled for mounting an electrical connector on a supporting member, such as a panel, modules, circuit rack or the like, thereby dispensing with the necessity of heretofore known screw and rivet arrangements.

A further object of the present invention is to provide an improved assembly including an electrical connector to be mounted on a workpiece, such as a panel, modules, circuit rack or the like, and a fastener device for retaining the connector in mounted position on the workpiece and in a manner to prevent lateral shifting movement of the connector irrespective of tolerance variations between the parts.

Further objects and advantages of the present invention will be apparent to those skilled in the art as the description herein proceeds with reference to the accompanying drawings in which like reference characters designated like parts throughout and in which.

Figure 1:
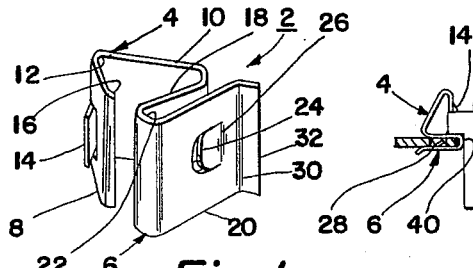
FIG. 1 is an enlarged generally perspective view of the fastener device made in accordance with the present invention.
Figure 2:
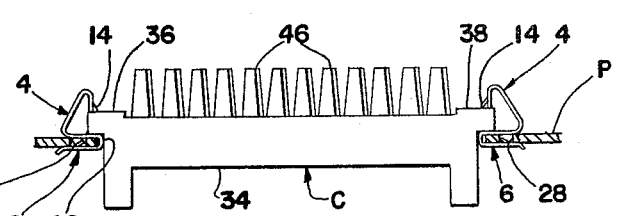
FIG. 2 is a fragmentary elevational view partly in section and showing a pair of the fastener devices of FIG. 1 in assembled position for mounting an article, such as an electrical connector, on an apertured support member.
Figure 3:
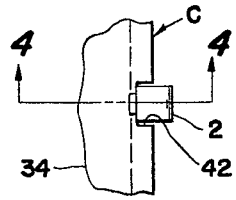
FIG. 3 is an enlarged fragmentary top plan view showing the fastener in assembled position within the notched portion of one of the flanged ends of the connector.
Figure 4:
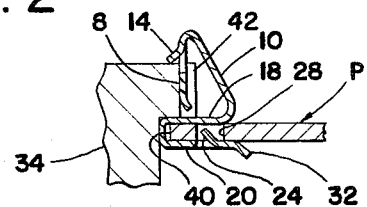
FIG. 4 is a longitudinal cross-sectional view taken along the plane indicated by the line 4—4 of FIG. 3.

Referring now again to the drawings and in particular to FIGS. 1 to 4 thereof, there is shown one embodiment of the fastener device, designated generally at 2, for mounting an electrical connector C on an aperture support panel P, such as might be utilized in an electronic installation. The fastener 2 is of a relatively simple, inexpensive construction susceptible for economical quantity production from standard sheet metal strip with minimal waste of material. The fastening 2 may be made from any suitable sheet material preferably that of a spring-like nature, such as spring steel or cold rolled steel having spring-like characteristics. As best shown in FIG. 1, a generally triangularly shaped arm portion 4 is provided for attachment to the connector C or to any other desired article, and a generally U-shaped clip portion 6 is provided for attachment to the panel P. The connector attachment portion 4 is defined by and includes a pair of inner 8 and outer 10 resilient legs joined together by a curved apex section 12. As shown, the legs 8 and 10 diverge from one another from the apex of the triangular configuration defined and in the general direction of the U-shaped portion 6. In the embodiment shown, the inner leg 8 preferably includes a resilient tongue 14 struck from the material of the leg. The tongue 14 projects angularly outwardly and downwardly from the general plane of the leg 8 for coacting overlying engagement against the top or upper surface of a flanged end of the connector C to prevent shifting movement of the connector in a general vertical direction, as best shown in FIGS. 2 and 4. The leg 8 also includes an angularly inwardly bent cam-like flange 16 which is laterally spaced from the U-shaped portion 6 to facilitate application of the fastener to the connector.

The U-shaped clip portion 6 includes and is defined by another resilient leg 18 which extends inwardly from the free end of the outer leg 10 and a leg 20 which extends outwardly from a curved bight section 22 joining the legs 18 and 20 together to provide the U-shaped configuration shown. The legs 18 and 20 converge angularly towards one another from the curved section 22 toward the open end thereof to provide a yieldable clip-like arrangement which is readily adapted to engage various thickness of flanged end portions of the panel P, as hereinafter more fully described.

In the embodiment shown, the U-shaped clip portion 6 further includes a resilient tab 24 struck from the leg 20 along the bend line 26. Preferably, the tab 24 projects angularly upwardly from the general plane of the leg 20 in the general direction of the section 22 so that when the U-shaped clip portion 6 of the fastener is applied to the panel P, the tab 24 snaps into coacting engagement within an aperture 28 (FIG. 4) provided in the panel to prevent any movement of the fastener relative to the panel. Moreover, such tab arrangement permanently locks the fastener to the panel and effectively prevents any inadvertent shifting movement of the fastener relative to the panel. To facilitate application of the U-shaped clip portion 6 to the panel, the free end of the leg 20 may be bent downwardly and outwardly along the bend line 30 to provide a cam-like flange 32 which extends beyond the extension of the leg 18.

As illustrated in FIG. 2 the connector C includes a body 34 made preferably from an electrical insulating material, such as a ceramic or polymeric material or other such material having electrical insulating characteristics. The body 34 in the embodiment shown is provided with a pair of flanged ends 36 and 38 extending laterally outwardly from opposite ends of the body and which are adapted to overlie the marginal portions of an opening 40 provided in the panel P. In order to prevent lateral shifting movement of the connector C relative to the panel P, the flanged ends 36 and 38 may be notched out, as shown at 42 of FIG. 3, to readily accommodate therein the inner legs 8 of a pair of fastening devices which are adapted to be assembled at opposite sides of an opening 40 in the panel P, thereby to engageably retain the flanged ends 36 and 38 of the connector C in assembled position on the panel. The connector C may be provided with suitable male electrical connection elements 46 for connection to a source of power (not shown). Moreover, by use of a pair of the fastener devices 2 constructed in accordance with the present invention, any number, size, and/or shape of connector may be readily applied to any size, and/or shape of apertured support panel dependent upon the desired application, such as may be utilized in an electronic installation.

In a typical application of the embodiment illustrated, the assembly may be achieved simply by securing a pair of the fastening devices 2 to the marginal portions of the opening 40 in the panel P so that the connector C can be inserted through the opening 40 and held in resilient snap-fastening engagement by the fasteners. More particularly, as the connector C is inserted through the opennig 40, the flanged ends 36 and 38 thereof cam against and over the resilient tongues 14 of the respective fasteners to progressively force the inner legs 8 inwardly in the general direction of the outer legs 10 until they are disposed in a generally parallel relationship with the confronting outer side surfaces of the respective flanged ends 36 and 38. Such movement is continued until the tongues 14 snap back and into overlying relationship against the top or upper surface of the flanged ends 36 and 38, whereupon, the flanged ends are locked against vertical movement between the resilient tongues 14 and the legs 18 of the U-shaped portions 6 of the fasteners. Moreover, in the assembled position, the inner legs 8 are snuggly seated under tension within the notches 42 of the flanged ends 36 and 38 to prevent any lateral shifting movement of the connector C relative to the fasteners. Hence, it can be seen that the U-shaped clip portions 6 and the tabs 24 provide a cooperative effect to prevent movement of the fastener in any direction relative to the panel P; while the legs 8 and tongues 14 of the triangular arm portion 4 combine to prevent any movement of the connector C relative to the fastener, thereby to prevent any movement of the connector relative to the panel in the assembled position of the fastener.

Figure 5:
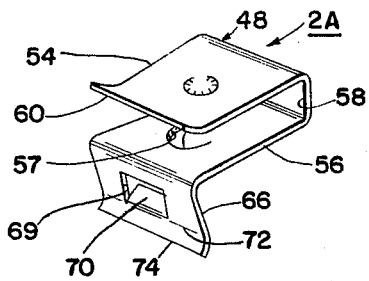
FIG. 5 is an enlarged generally perspective view of a modification of the fastener device made in accordance with the present invention.
Figure 6:
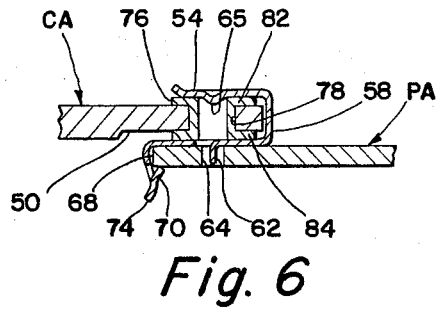
FIG. 6 is a fragmentary cross-sectional view showing one end of an article, such as an electrical connector, mounted through an opening in a support member by one of the fastener devices shown in FIG. 5.

In FIGS. 5 and 6 there is illustrated a modification of the fastener device designated, generally at 2A, which is generally similar to that shown in FIGS. 1 to 4 for mounting a connector CA to an apertured support panel PA. In this form, the fastener includes a similar U-shaped portion 48, but wherein such portion is adapted for attachment with the flanged ends 50 (FIG. 6) of the connector CA rather than with the panel PA. Here again, the U-shaped portion 48 includes and is defined by a pair of upper 54 and lower 56 resilient legs joined together by a curved bight section 58. The legs converge angularly toward one another in the direction of their open end to accommodate various thickness of flanged ends of the connector. The upper leg 54 is similarly provided with an upwardly and outwardly extending cam-like flange portion 60 to facilitate attachment of the fastener to the connector. The material of the lower leg 56 is struck-out, as at 57, to provide a resilient tab 62 (FIG. 6) for engagement within a corresponding aperture 64 provided in the panel to prevent movement of the fastener relative to the panel, as aforesaid. In this form, however, the material of the upper leg 54 is preferably depressed downwardly to provide a peripherally-continuous hollow projection 65 which extends inwardly from the general plane of the leg 54 in the general direction of the leg 56 to prevent movement of the connector relative to the panel, as will hereinafter be more fully described.

In this embodiment, the lower leg 56 is preferably bent downwardly and inwardly to provide a resilient spring-arm 66 for engagement with a confronting marginal portion of an opening 68 provided in the panel PA. The material of the arm 66 is struck-out, as at 69, to provide a resilient tongue 70 which projects upwardly and angularly outwardly in the general direction of the leg 56, and which is adapted for engagement against the bottom or undersurface of the panel adjacent the marginal portion of the opening 68 therein. The free end of the arm 66 may be bent outwardly along the bend line 72 to provide a cam-like flange 74 to facilitate securement of the fastener to the panel.

In application of this form, the flanged ends 50 of the connector CA may be provided with a rivet-like member 76 disposed for floating engagement within an aperture 78 provided adjacent the end thereof. The rivet-like member 76 may be of a hollow barrel-like construction including a pair of oppositely disposed collar portions 82 and 84 adapted to bear, in the assembled position of the rivet, against the upper and lower surfaces, respectively, of the flanged ends 50 of the connector. Hence, upon assembly, a pair of the fastening devices 2A may be attached to the connector CA simply by inserting the U-shaped portions 48 over the flanged ends 50 of the connector until the depressed projections 65 are snuggly seated against the collars 82 and 84, respectively, of the associated rivets 76. With the fasteners thus assembled, the connector may then be inserted into the opening 68 in the panel, whereupon the resilient arms 66 will be pressed outwardly upon engagement of marginal portions of the opening 68 against the tongues 70. As such movement continues, the tongues 70 are caused to snap-back and into engagement against the confronting lower surface of the panel adjacent the panel opening 68, so that the panel is gripped between the legs 56 of the U-shaped portions 48 and the respective tongues 70 of the arms 66. Thus, in the assembled position, the legs 56 and depressed projections 65 of the legs 54 combine to prevent movement of the fastener in any direction relative to the connector; while the tabs 62 of the legs 56 and the tongues 70 of the arms 66 prevent movement of the fastener in any direction relative to the panel, thereby to prevent movement of the connector in any direction relative to the panel in the assembled position of the fastener.

Figure 7:
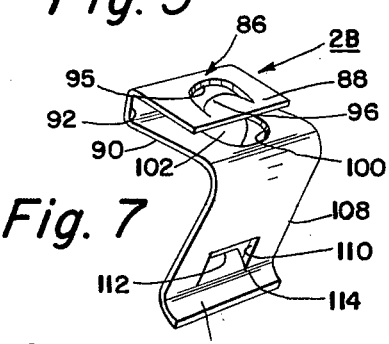
FIG. 7 is an enlarged generally perspective view of another modification of the fastener device made in accordance with the present invention.
Figure 8:
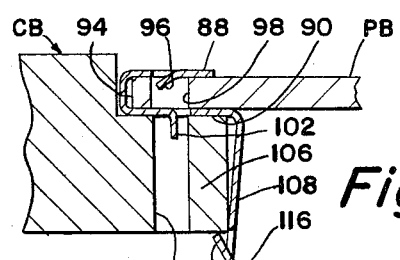
FIG. 8 is a fragmentary cross-sectional view showing one end of an article, such as an electrical connector, mounted in suspended relation through an opening in a support member by one of the fastener devices shown in FIG. 7.

In the embodiment illustrated in FIGS. 7 and 8, the fastener device, designated generally at 2B, is generally similar to that shown in FIGS. 5 to 6, but wherein the assembly is particularly useful in mounting a connector CB in suspended relationship from the underside of a support panel PB. In this form, the fastener includes a U-shaped panel engaging portion 86 which includes and is defined by a pair of resilient upper 88 and lower 90 legs joined together at one end by a curved bight section 92. The legs converge angularly toward one another in the direction of the open end to provide a resilient clip arrangement for gripping therebetween the margins of the panel adjacent an opening 94 (FIG. 8) provided in the panel. The material of the upper leg 88 is preferably struck-out, as at 95 to provide a resilient tab 96. The tab 96 projects outwardly and angularly inwardly from the general plane of the leg 88 in the general direction of the curved section 92, and is adapted to be received in an aperture 98 provided in the panel adjacent the panel opening 94 to prevent movement, and particularly lateral shifting movement of the fastener relative to the panel. In this form, however, material of the lower leg 90 is also struck-out, as at 100, to provide another tab 102 which projects downwardly from and generally normal to the general plane of the leg 90. Moreover, upon assembly, the tab 102 is adapted to be disposed in a generally vertically extending hole 104 provided in a flanged end 106 of the connector to prevent movement, and particularly lateral shifting movement of the connector relative to the panel.

Here again, the lower leg 90 is preferably bent downwardly and angularly inwardly to provide a resilient spring arm 108, but in this form, the arm 108 is adapted for engagement with the flanged end 106 of the connector so as to suspend the connector in mounted relationship from the underside of the panel. The material of the arm 108 is similarly struck-out, as at 110, to provide a resilient tongue 112 which projects outwardly and angularly upwardly from the general plane of the arm 108 in the general direction of the leg 90 for engagement with the bottom or lower surface of the flanged end 106, as shown in FIG. 8. Hence, the distance between the lower leg 90 of the U-shaped portion 86 and the tongue 112 of the resilient arm 108 may be predetermined to accommodate various thickness of flanged ends of the connector. The free end portion of the arm 108 may be bent angularly outwardly along the bend line 114 to provide a cam-like flange 116 to facilitate assembly of the fastener with the connector.

Figure 9:
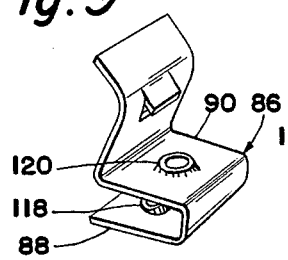
FIG. 9 is an enlarged generally perspective view of another modification of the fastener device made in accordance with the present invention.
Figure 9A:
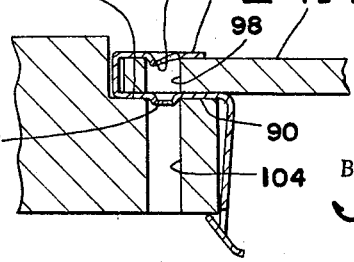
FIG. 9A is a fragmentary cross-sectional view showing one end of an article, such as an electrical connector, mounted through an opening in a support member by one of the fastener devices of FIG. 9.

In FIGS. 9 and 9A there is illustrated a modification of the fastener shown in FIGS. 7 and 8, but wherein the material of the upper leg 88 is deformed to provide a warped edge 118 which projects downwardly therefrom for engagement within the aperture 98 to prevent movement of the fastener relative to the panel PB. In this form, the lower leg 90 is deformed to provide a generally conical projection 120 which projects downwardly therefrom and in parallel alignment with the warped edge 118 for engagement within the hole 104 provided in the connector, thereby to prevent movement of the latter relative to the panel, as aforesaid.

Figure 10:
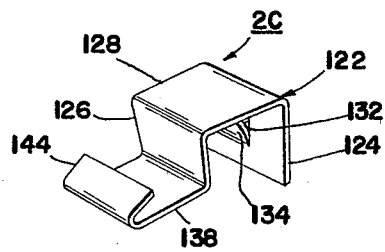
FIG. 10 is an enlarged perspective view of another modification of the fastener device made in accordance with the present invention.
Figure 11:
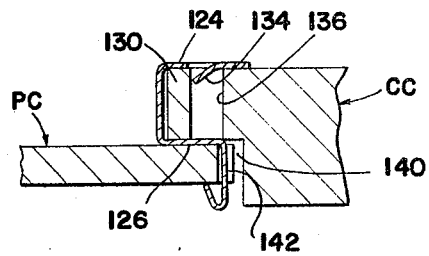
FIG. 11 is a fragmentary cross-sectional view showing one end of an article, such as an electrical connector, mounted through an opening in a support member by one of the fastener devices shown in FIG. 10.

In FIGS. 10 and 11 there is illustrated another embodiment of the fastener device, designated generally at 2C which is generally similar in application to that shown in FIGS. 5 and 6. In this form, however, the U-shaped portion 122 for engagement with the connector CC includes a pair of resilient legs 124 and 126 which are integral with and extend outwardly from a generally planar bight section 128. The legs 124 and 126, in the untensioned position of the fastener, converge at a slight angle toward one another in a direction away from the section 128 so as to provide an effective resilient gripping engagement with a flanged end 130 (FIG. 10) of the connector in the final assembled position of the fastener. The upper leg 124 projects outwardly beyond the outward extension of the lower leg 126 and is cut-out, as at 132 to provide a resilient tab 134. The tab 134 projects outwardly and angularly inwardly from the general plane of the leg 124 is the general direction of the section 128 for engagement within a generally vertical hole 136 provided in the flanged end 130 of the connector to prevent movement, and particularly lateral shifting movement of the connector relative to the fastener, as aforesaid.

In this form, a generally planar spring arm 138 projects downwardly and generally at right angles from the lower leg 126 for engagement with a panel PC immediately adjacent an opening 140 provided in the panel. The arm 138 is preferably of a transverse dimension so as to be snugly seated within a generally polygonal shaped notched portion 142 provided in the marginal edge of the panel adjacent the panel opening 140. The arm 138 is provided adjacent its free end with a reverse bent flange portion 144 which extends angularly outwardly and upwardly from the general plane of the arm 138 in the general direction of the lower leg 126 for engagement with the bottom or confronting undersurface of the panel to lock the fastener in assembled position with the panel. Moreover, by such arrangement, any movement, and particularly any lateral shifting movement of the fastener relative to the panel is prevented.

Figure 12:
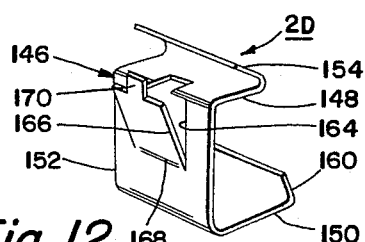
FIG. 12 is an enlarged generally perspective view of a further modification of the fastener device made in accordance with the present invention.
Figure 13:
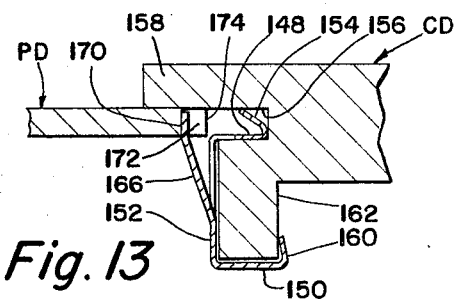
FIG. 13 is a fragmentary cross-sectional view showing one end of an article, such as an electrical connector, mounted in an opening in a support member by one of the fastener devices shown in FIG. 12.

In FIGS. 12 and 13 there is illustrated another embodiment of the fastener, designated generally at 2D, for mounting another type of electrical connector CD to a support panel PD. In this form, the fastener 2D is formed so as to provide a generally U-shaped connector engaging portion 146 which includes and is defined by an upper 148 and lower 150 resilient legs which project outwardly and at generally right angles from a generally planar bight section 152. The upper leg 148 is reversely bent upwardly and angularly inwardly adjacent its free end to provide a resilient flange 154 defining a shoulder for engagement within a polygonal shape slot 156 defining a flanged end 158 of the connector. The low leg 150 is bent upwardly and angularly inwardly adjacent its free end to provide another shoulder defining flange 160 for engagement against an inner surface of an integral leg 162 extending downwardly from the body of the connector. By such an arrangement, it can be seen that the shoulder defining flanges 154 and 160 of the U-shaped portion 146 effectively combine to prevent movement, and particularly lateral shifting movement of the connector relative to the fastener.

To effect securement of the fastener 2D to the panel PD, the material of the bight section 152 and the upper leg 148 of the U-shaped portion 146 is preferably struck-out, as at 164, to provide a resilient spring-arm 166. The arm 166 is preferably bent outwardly along the bend line 168 and extends angularly upwardly from the general plane of the base 152. As shown, the arm 166 includes a polygonal shaped tongue 170 having a substantially reduced transverse dimension compared to the transverse dimension of the arm 166 so as to be snugly disposed in a corresponding notched portion 172 (FIG. 13) provided in the panel immediately adjacent an opening 174 in the panel. Moreover, in the assembled position, the arm 166 and tongue 170 effectively combine to prevent movement, and particularly any lateral shifting movement of the fastener relative to the panel, and hence, any movement of the connector relative to the panel, as aforesaid.

Figure 14:
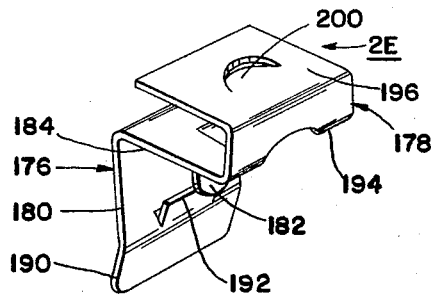
FIG. 14 is an enlarged generally perspective view of still another modification of the fastener device made in accordance with the present invention.
Figure 15:
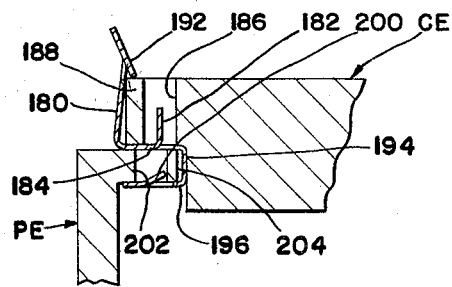
FIG. 15 is a fragmentary cross-sectional view showing one end of an article, such as an electrical connector, mounted in an opening in a support member by one of the fastener devices shown in FIG. 14.

In FIGS. 14 and 15 there is illustrated another embodiment of the fastener device, designated generally at 2E, which is generally similar in application to that shown in FIGS. 7 to 9. In this form, the strip is formed so as to provide what may be termed a double U-shaped construction comprising a U-shaped portion 176 for attachment to a connector CE and another U-shaped portion 178 disposed generally at right angles to the first mentioned U-shaped portion for attachment to a support panel PE. The U-shaped connector engaging portion 176 includes and is defined by a resilient leg 180 and tongue 182 which project upwardly from a generally planar base 184 which is common to both of the U-shaped portions 176 and 178, as more fully described herein. The tongue 182 is substantially shorter relative to the leg 180 and is disposed generally normal to the base 184 and is adapted to be inserted into a hole 186 provided in a flanged end 188 of the connector. The leg 180 projects at a slight angle inwardly in the general direction of the tongue 182 for engagement against the outer surface of the flanged end 188 of the connector. As shown, the free end of the leg 180 is bent outwardly, as at 190, and is struck-out adjacent its free end to provide a resilient tongue 192. As shown in FIG. 15, the tongue 192 projects downwardly and angularly outwardly from the general plane of the leg 180 in the general direction of the tongue 182 for engagement with the top or upper surface of the flange end 188 of the connector, thereby to effectively retain the connector in assembled position with the fastener.

As shown in FIG. 15, the base 184 which is common to the U-shaped portions 176 and 178 is preferably bent downwardly, as at 194, and then inwardly, as at 196, to provide a generally L-shaped leg which together with the base 184 provides the generally U-shaped configuration of the panel engaging portion 178 shown. The leg 196 is struck-out to provide a resilient tab 200 for coacting engagement within an aperture 202 provided in the panel immediately adjacent an opening 204 provided in the panel. By such arrangement, it can be seen that the double U-shaped construction of the fastener 2E effectively locks the connector to the fastener, and hence, effectively locks the fastener to the panel, thereby preventing any movement of the connector relative to the panel.

Figure 16:
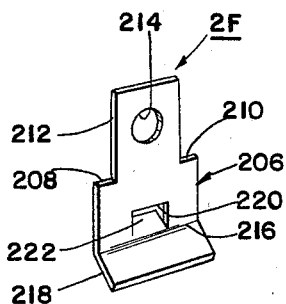
FIG. 16 is an enlarged generally perspective view of still a further modification of the fastener device made in accordance with the present invention.
Figure 17:
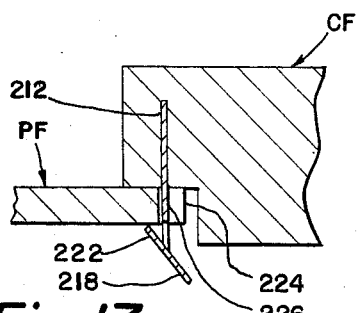
FIG. 17 is a fragmentary cross-sectional view showing one end of an article, such as an electrical connector, mounted in an opening in a support member by one of the fastener devices of FIG. 16.

In FIGS. 16 and 17 there is illustrated another embodiment of the fastener device, designated generally at 2F, which is particularly useful in mounting an electrical connector CF to a support panel PF, but wherein the fastener has been provided as a composite, unitary part of the connector. In this form, the strip is provided so as to define a generally flat or planar base 206 which is struck-out adjacent one end and on either side thereof, as at 208 and 210, to provide a portion 212 of reduced transverse dimension relative to the transverse dimension of the main body of the base. Such reduced portion is adapted to be fixedly embedded in the material of the connector (FIG. 17). This reduced portion 212 is preferably provided adjacent its free end with an aperture 214 so that when such portion is embedded in the material of the connector there is achieved a positive anchoring construction to prevent any movement of the fastener relative to the connector.

The other end of the base 206 is bent along the bend line 216 to provide a flange 218 which extends downwardly and angularly outwardly from the general plane of the base 206. The base 206 is struck-out immediately adjacent the bend line 216, as at 220, to provide a resilient tongue 222 which projects outwardly and angularly upwardly from the opposite side of the base and in the same general plane as the flange 218 for engagement with the bottom or undersurface of the panel adjacent the panel opening 224. Here again, the panel may be notched out, as at 226, immediately adjacent the opening 224 to snugly receive therein the base 206 of the fastener, as shown in FIG. 17.

Hence, in application of this form of the invention, a pair of the fastening devices 2F may be readily preassembled with the connector CF simply by embedding the reduced portions 212 thereof in the material of the flanged ends 226 of the connector, such as by conventional molding techniques, thereby to provide a composite, unitary structure. Thus assembled, the connector CF may then be inserted into the opening 224 in the panel PF so that the fasteners are disposed through the notched portions 226 immediately adjacent the panel opening 224. In this assembled position, the resilient tongues 222 are disposed in locking engagement against the confronting bottom or undersurface of the panel immediately adjacent the panel opening 224, thereby to effectively prevent any movement of the fastener relative to the panel, and hence, to prevent any movement of the connector relative to the panel in the final assembled position thereof.

From the foregoing description and accompanying drawings of the embodiments of the fastener device made in accordance with the present invention, it can be seen that an article or object, such as an electrical connector, can readily and easily be applied to a support member, such as a panel, and in a manner to effectively prevent any movement of the connector relative to the panel in the assembled position. It can be seen further that such assembly can be accomplished regardless of any tolerance variations between the parts and regardless of any size, shape or thickness variations of connector and/or panel. Hence, though the fastener device and assembly illustrated herein have been illustrated in connection with the mounting of an electrical element, such as a connector, to a supporting panel, it is to be understood that the fastener device and assembly contemplated herein can also be satisfactorily utilized for mounting other articles or objects, such as moldings, trim strips, inspection plates, covers and the like, to other types of supporting members, such as chassis, frames, or other similar such type of supporting panel.

Thus, while we have illustrated herein a preferred embodiment of our invention, it is to be understood that changes and variations may be made by those skilled in the art without departing from the spirit and scope of the appended claims.

I claim:

1. A fastening device for connecting a pair of members in assembled relationship, said device comprising a pair of spaced, resilient legs extending from a bight portion connecting said legs together and defining therewith a generally U-shaped section adapted for receiving therebetween a portion of one of said members, one of said legs including a first retainer means extending outwardly therefrom adapted for engageable coaction within an aperture provided in one of said members, the other of said legs including a second retainer means extending outwardly therefrom and disposed generally opposite to said first retainer means adapted for engageable coaction within an aperture provided in the other of said members, and a resilient arm extending outwardly from the free end of one of said legs, said arm including an attachment means adapted for overlying engagement with a marginal end portion of one of said members for retaining the latter in assembled relationship with the other of said members.

2. A fastening device in accordance with claim 1, wherein one of said retainer means includes a peripherally-continuous projection depressed from the material of one of said legs for seated engagement against a rivet-like element adapted to be disposed through an aperture provided in an associated one of said members, said arm extending angularly downwardly from the general plane of the other of said legs, and said attachment means including a resilient tongue struck from the material of said arm and extending angularly outwardly in the general direction of said last mentioned leg.

3. A fastening device in accordance with claim 1, wherein one of said retainer means includes a tab struck from the material of one of said legs and extending in the general direction of said interconnecting section and cooperating therewith for retaining the fastener in assembled relationship with the associated one of said members, said arm extending downwardly and angularly inwardly from the general plane of the other of said legs, and said attachment means including a resilient tongue struck from the material of said arm and extending outwardly and angularly upwardly therefrom in the general direction of said last mentioned leg.

4. A fastening device in accordance with claim 1, wherein said first retainer means includes a warped edge formed from the material of its associated leg, and wherein said second retainer means includes a generally conical projection formed from the material of its respective leg.

5. A fastener device in accordance with claim 1, in which said attaching means includes a resilient tongue struck from said arm and extending angularly outwardly in the general direction of said first mentioned retainer means for engagement with the confronting upper surface of an article.

6. A fastening device for mounting an article in an opening in a support member, such as a panel or the like, said device comprising a pair of spaced, resilient legs extending in the same general direction from a bight portion joining said legs together to provide therewith a generally U-shaped section for receiving therebetween an edge portion of a support member, one of said legs having a resilient tab extending outwardly therefrom adapted for engagement with an aperture provided in said support member adjacent the opening therein, the other of said legs having a resilient tongue extending outwardly therefrom and disposed generally opposite to said tab adapted for engagement within an aperture provided in said article, a resilient arm extending upwardly from the free end of said last mentioned leg in the same general direction as said tongue, and said arm having an attachment means adapted for engagement with an upper marginal surface of said article and cooperating with said tongue for retaining said article in assembled relationship with said support member.

7. A fastening device in accordance with claim 6, wherein said arm extends upwardly at an angle from said leg in the general direction and toward said tongue for resilient biasing engagement with an end surface of said article, the free end of said arm being bent outwardly from the general plane of said leg to provide an oblique end portion.

8. A fastening device in accordance with claim 7, wherein said attachment means includes a resilient tongue struck outwardly from said leg, said tongue disposed in the general plane of said oblique portion and extending in the general direction toward said first mentioned tongue.

9. A fastening device for mounting an article in an opening of a support member, such as a panel or the like, said device comprising a pair of spaced, resilient legs extending in the same general direction from a bight portion joining the legs together to provide a generally U-shaped section for receiving therebetween a marginal edge portion of a support member adjacent the opening therein, one of said legs having a resilient tab struck outwardly therefrom extending toward said bight portion adapted for engagement within an aperture provided in said support member adjacent the opening therein, the other of said legs having a resilient tongue struck outwardly therefrom extending generally parallel to said bight portion adapted for engagement within an aperture provided in said article, a resilient arm extending angularly upwardly from the free end of said last mentioned leg in the general direction toward said tongue adapted for engagement with an end surface of said article, and a resilient tongue struck outwardly adjacent the free end of said arm adapted to overlie and engage the upper end surface of said article, thereby cooperating with said first mentioned tongue for retaining said article in assembled relationship with said support member.

10. In the combination with a support member, such as a panel or the like, having an opening therein, at least one pair of oppositely disposed fastening device secured over the marginal edges presented by the opening in said support member, an article adapted to be mounted within said opening between a pair of said devices and having end portions overlying the support member on one side thereof, each of said devices comprising a pair of spaced, resilient legs extending from the bight portion and mounted over a marginal edge presented by the said opening, one of said legs having a resilient tab struck outwardly therefrom and disposed within an aperture provided in said support member adjacent the opening therein, the other of said legs having a resilient tongue struck outwardly therefrom and disposed within an aperture provided in an overhanging portion of an article, a resilient arm extending upwardly from the free end of said last mentioned leg in the same general direction as said tongue, and the free end of said arm having an attachment means disposed in engagement with an overlying portion of an article.

11. The combination in accordance with claim 10, wherein the arm of each of said devices extends angularly upwardly toward said tongue for resilient biasing engagement against the end surface of an overlying portion of an article, the free end of said arm being bent outwardly to provide an obliquely extending end portion.

12. The combination in accordance with claim 11, wherein said attachment means includes a resilient tongue struck outwardly from said arm, said tongue being disposed in the general plane of said obliquely extending end portion and projecting downwardly in the general direction toward said first mentioned tongue for overlying engaged relation with the upper surface of an overlying portion of an article.

References Cited by the Examiner

UNITED STATES PATENTS

| | | | |
|---|---|---|---|
| 2,278,691 | 4/1942 | Cotter | 24—73 |
| 2,345,004 | 3/1944 | Place | 24—73 |
| 2,581,481 | 1/1952 | Hartman et al. | 151—41.75 |
| 2,775,010 | 12/1956 | Bedford | 24—73 |
| 2,779,114 | 1/1957 | Orthwine | 40—11 |
| 2,811,328 | 10/1957 | Ericson | 248—27 |
| 2,894,771 | 7/1959 | Putnam | 24—73 X |
| 2,968,780 | 1/1961 | Roswell | 339—95 X |

CLAUDE A. LE ROY, *Primary Examiner.*

W. D. LOULAN, *Assistant Examiner.*